United States Patent

Rubin et al.

Patent Number: 6,078,897
Date of Patent: Jun. 20, 2000

[54] METHOD AND APPARATUS FOR OPTIMIZING ORDERS FOR GOODS OR SERVICES TO INCREASE A DISCOUNT

[75] Inventors: David R Rubin; Mark S Geller, both of Palo Alto, Calif.

[73] Assignee: Intraware, Inc., Orinda, Calif.

[21] Appl. No.: 09/018,025

[22] Filed: Feb. 2, 1998

[51] Int. Cl.[7] .................................................. G06F 17/60
[52] U.S. Cl. ............................ 705/14; 705/8; 705/10; 705/35
[58] Field of Search ..................... 705/14, 1, 8, 9, 705/10, 22, 27, 28, 35, 36; 702/194

[56] References Cited

U.S. PATENT DOCUMENTS

| | | | |
|---|---|---|---|
| 4,996,642 | 2/1991 | Hey | 705/27 |
| 5,550,746 | 8/1996 | Jacobs | 364/479.01 |
| 5,615,109 | 3/1997 | Eder | 705/8 |
| 5,731,991 | 3/1998 | Kinra et al. | 702/186 |
| 5,913,202 | 6/1999 | Motoyama | 705/35 |

*Primary Examiner*—James P. Trammell
*Assistant Examiner*—Demetra R. Smith
*Attorney, Agent, or Firm*—Law Offices of Charles E. Gotlieb

[57] ABSTRACT

A method and apparatus accepts a proposed order for products and/or services directed toward a vendor and identifies one or more additional orders that can be combined with the proposed order to obtain a higher volume discount than would be obtained submitting the proposed order by itself. One or more additional orders may contain a quantity of one product available from the vendor that, when combined with the proposed order, will qualify for the next discount higher than would be obtained by the proposed order alone and costs lower than cost of achieving the same discount using another product available from the vendor. One or more additional order may contain a quantity of one product in the proposed order that, when combined with the proposed order, will qualify for the next discount higher than would be obtained by the proposed order alone and costs lower than the cost of achieving the same discount using another product in the proposed order. One or more additional orders may contain all of the products in the proposed order that, when combined with the proposed order, will qualify for the next discount higher than would be obtained by the proposed order alone and is scaled so that the quantities of the products in the additional order are approximately the same as the quantity of products in the proposed order. The user can add one or more additional orders to the proposed order, and then submit the new proposed order.

39 Claims, 3 Drawing Sheets

METHOD AND APPARATUS FOR OPTIMIZING ORDERS FOR GOODS OR SERVICES TO INCREASE A DISCOUNT

RELATED APPLICATIONS

The subject matter of this application is related to the subject matter of application Ser. No. 08/680,914 entitled, "Method, Apparatus and Computer Program Products for Efficiently Distributing Information" filed on Jul. 12, 1996 by Jonathan Goldman and having the same assignee as this application and incorporated herein by reference in its entirety, and application Ser. No. 08/938,918 entitled, "Method and System for Ranking Multiple Products According to Users' Preferences" filed on Sep. 26, 1997 by Mark S. Geller and David R. Rubin and having the same assignee as this application and incorporated herein by reference in its entirety.

FIELD OF THE INVENTION

The present invention is related to computer software and more specifically to computer software for ordering goods and/or services.

BACKGROUND OF THE INVENTION

To receive certain goods or services an order may be placed with a supplier. In the case of computer software, an order may be placed and the goods delivered in response to the order. Alternatively, the computer software customer places an order for the right to make a certain number of copies of one or more titles of computer software. Once the "order" is placed, the customer has the right to make the copies specified in the order. As used herein, the term, "order" is expanded to include such an order for the right to make additional copies of computer software, and any request to use goods or have services supplied. As used herein, the term "product" is intended to mean any good or service.

Each order for products may contain various types of products. For example an order for computer software may contain an order for various titles of computer software directed to a supplier.

Some orders for products are discounted based on a volume related to the amount of products in the order. If a certain volume of products is ordered together, a volume discount applies. A larger discount may be available for orders of larger volumes. The discount is calculated by determining the highest volume discount threshold that does not exceed the volume of the order. For example, orders with a volume of at least 50 might receive a 10% discount, and orders with a volume of at least 100 might receive a 15% discount. The thresholds are 50 and 100.

The volume of an order may be calculated based on any of a number of factors. For example, the volume may be based on the non-discounted dollar value of the order. The volume may be based on a number of products ordered. The volume may be based on a number of units ordered, with each product counting for a predetermined number of units, referred to as a weight. The complexity of the discount structure is heightened by the fact that each vendor of products may implement a discount structure that uses different volume and threshold calculations different from other vendors.

Because of the complexity of the discount structure of each supplier, a customer may not be aware at the time an order for goods and/or services is placed that a moderately larger order can increase the discount available. The customer may be willing to increase the order, ordering more than is needed for example, so as to realize the additional discount, if the customer knew by how much it was necessary to increase the order to realize the additional discount. Because there may be multiple ways of increasing an order to realize additional discounts, it may be necessary to calculate multiple increased orders, making the identification of additional discounts a complex, time-consuming and error-prone task. Because of the time involved in calculating multiple increased orders, many customers may forgo the increased discount available by increasing an order. In some cases, the additional discount would be almost as much or even more than the cost of the additional products required to achieve the added discount. Had the customer known of this fact, additional products could have been ordered at little or no added cost.

There exists a need for a method and apparatus to identify how to increase an order for goods or services to realize additional discounts.

SUMMARY OF INVENTION

A method and apparatus accepts a proposed order from a user, and identifies one or more additional orders that, when added to the proposed order increases the discount for the order to a volume discount threshold that is higher than the volume discount of the proposed order. The difference in the discounted price between the proposed order and the proposed order with each of the additional orders added is displayed to the user. The user can select none, one or more of the additional orders to add to the proposed order, and then place the order.

DETAILED DESCRIPTION OF A PREFERRED EMBODIMENT

Figure 1:
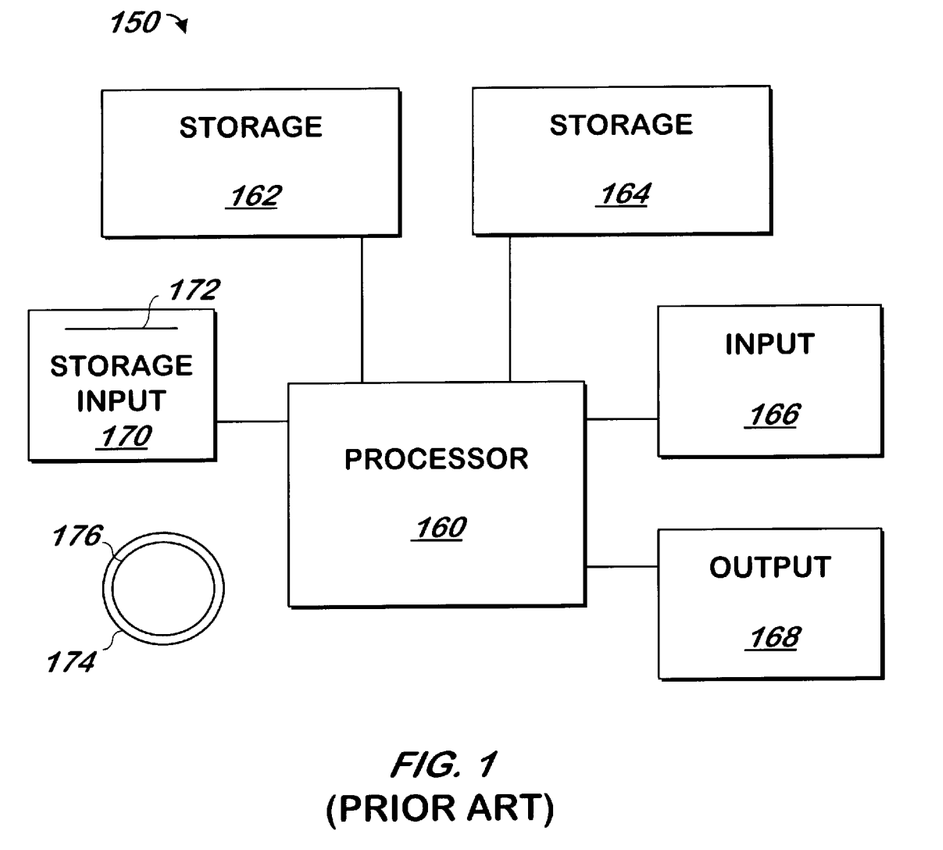
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional IBM compatible computer running the Microsoft Windows 95 operating system, although other systems may be used.

Figure 2:
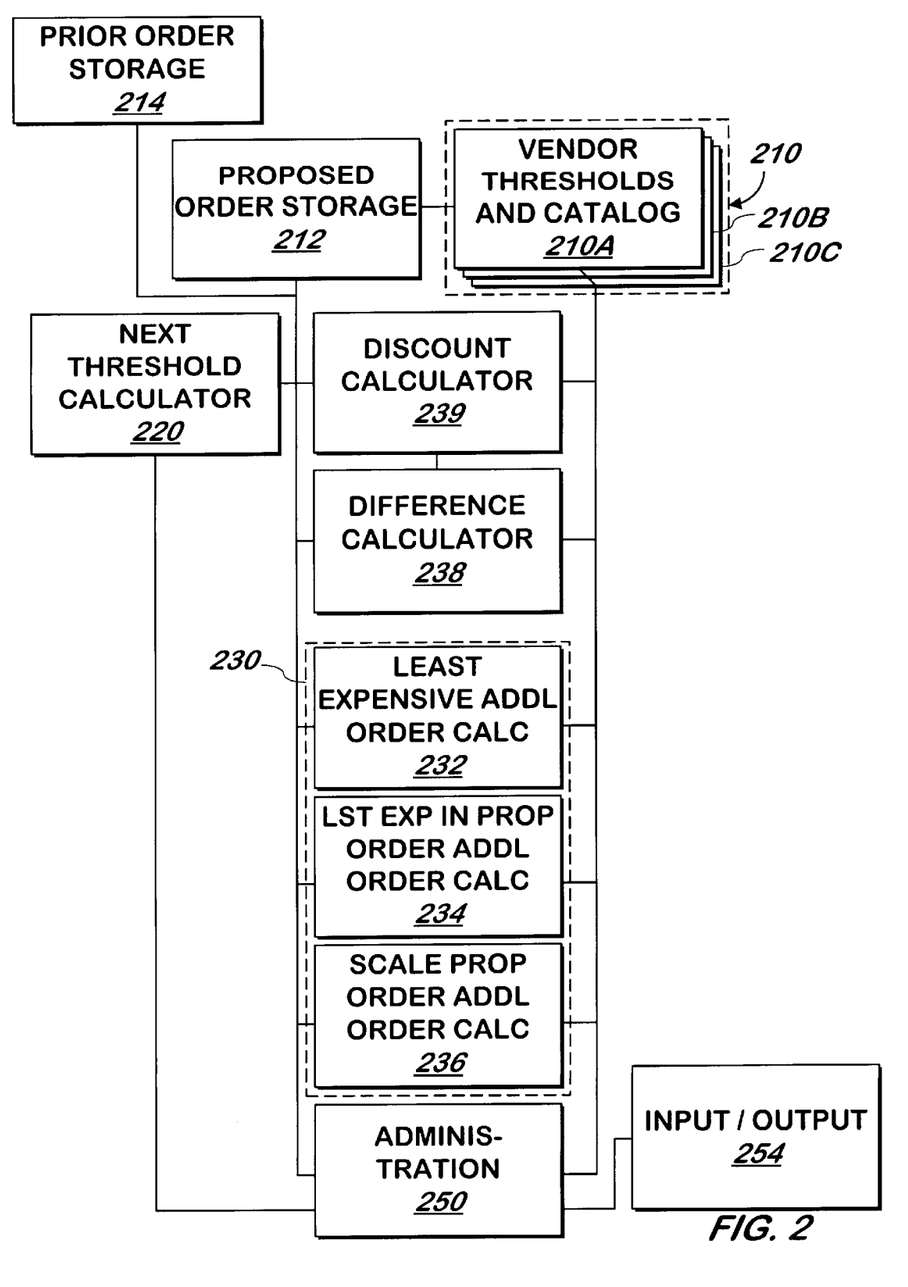
FIG. 2 is a block schematic diagram of an apparatus for identifying orders for additional products to realize a higher discount than in a proposed order according to one embodiment of the present invention.

Referring now to FIG. 2, an apparatus for identifying orders for additional products to realize a higher discount than in a proposed order according to one embodiment of the present invention. A user of the apparatus communicates with the apparatus using input/output 254. Input/output 254 may be a conventional keyboard/mouse/monitor combination, a modem or other communications link, or all of the above.

In one embodiment, vendor thresholds and catalog 210 stores, for each vendor or supplier from whom products and/or services may be ordered, a list of the products and/or services available from that vendor and the undiscounted price of each such product. In one embodiment, vendor thresholds and catalog 210 stores the weight of each product, and in other embodiments, the weight is inferred as "1" or the price of the product.

Vendor thresholds and catalog 210 also stores the volume thresholds for each discount level, and information regarding the calculation of the volume of an order. This information may include whether the volume is calculated based on the dollar volume of the order, or the number of products and/or services ordered. If the discount is based on a weighted number of products and/or services, the volume contribution known as the weight of each product is stored associated with the product. A weighted discount is sometimes referred to as a unit discount, with each product or service ordered counting for a specified number of units to be applied towards the discount.

The above information for the vendor thresholds and catalog 210 that is not inferred is received via input/output 254 by administration 250 and stored in vendor thresholds and catalog 210. In one embodiment, vendor thresholds and catalog 210 is a conventional relational database, such as is available from Informix Corporation of Menlo Park, Calif., with a product table holding the name, vendor identifier, undiscounted price, and unit or volume contribution, of each product. The volume contribution may be equal to the undiscounted price, a value of "1", or another weighted value. A discount table holds the vendor name, volume threshold and discount calculation such as a percentage discount for each discount threshold of each vendor for which the apparatus can accept orders.

A user enters a proposed order using input/output 254 and the proposed order is received by administration 250. The proposed order identifies a vendor, and one or more products and the quantity of the one or more products. Administration 250 directs the proposed order to proposed order storage 212, which may be any conventional storage such as memory or disk storage.

In one embodiment, some or all of proposed order storage 212 is a part of the product table in the database that makes up the vendor thresholds and catalog 210. Each product record contains a "proposed order quantity" field and the quantity for each product ordered is placed in this field to identify the proposed order. In one embodiment, the database enforces through conventional database validation rules a requirement that all products in a single order come from the same vendor.

Administration 250 signals next threshold calculator 220, which calculates the volume of the proposed order stored in proposed order storage 212. Using the threshold table corresponding to the vendor of the proposed order in vendor thresholds and catalog 210, next threshold calculator 220 calculates the volume of products and/or services that, when added to the proposed order, would allow the order to reach the next higher discount threshold. This calculation is performed by subtracting the volume of the proposed order from the next highest volume identified in vendor thresholds and catalog 210. Next threshold calculator 220 passes the calculated volume to administration 250. In one embodiment, if the volume of the proposed order stored in proposed order storage 212 is equal to a threshold, next threshold calculator 220 signals administration 250 by sending two values: 0 and the additional volume calculated. Administration 250 signals the user via input/output 254 that the order is on a threshold boundary, in addition to calculating the volume of the additional order that, when added to the proposed order, would supply sufficient volume to qualify the combined order for the next higher discount. Administration 250 sends the additional volume calculated by next threshold calculator 220 to additional order calculator 230.

Additional order calculator 230 calculates one or more orders for additional products that will produce the additional volume necessary to achieve the next higher threshold calculated by next threshold calculator 220 when the proposed order and the any one of the additional orders are combined into a single order. In one embodiment, additional order calculator 230 calculates three options for adjusting the proposed order to achieve the volume required for the next discount threshold.

Least expensive additional order calculator 232 in the additional order calculator 230 identifies the least expensive group of products offered by the vendor of the proposed order that will produce the additional volume calculated by next threshold calculator 220. To make this identification in one embodiment, every product offered by the vendor of the proposed order is investigated to identify the lowest quantity of the product that could be added to the proposed order to attain the next discount threshold. The quantity of each product identified is multiplied by the price of the product to obtain an extended price and the product or products having the lowest extended price are selected as an additional order to present to the user.

Least expensive additional order calculator 232 divides the additional volume by the volume contribution of each product having a vendor equal to the vendor identified in the proposed order stored in proposed order storage 212. For each product, the result of this division is rounded up and the rounded result multiplied by the price of the product to produce an extended price. One or more of the minimum extended prices is selected and the corresponding product identifier, quantity and total price is provided by least expensive additional order calculator 232 to administration 250 for presentation to the user.

In another embodiment, least expensive additional order calculator 232 divides the price of each product by the weight of the product to identify the one or more products that contribute the most to volume per dollar expended, and the product or products having the lowest price/weight result are the products identified. Least expensive additional order calculator 232 divides the additional volume by the weight of the products identified to identify a quantity for each product identified, and computes the extended price as described above using the quantity identified. One or more of the minimum extended prices is selected and the corresponding product identifier, quantity and total price is provided by least expensive additional order calculator 232 to administration 250 for presentation to the user.

In one embodiment, some or all of least expensive additional order calculator 232 is part of the database that holds vendor thresholds and catalog 210. For example, the additional volume calculated by next threshold calculator 220 may be passed as a global variable into the database, and each product record may contain calculation fields that calculate the quantity and total price for that product that would be required to produce the additional volume. Least expensive additional order calculator 232 builds and makes a query to the database to select the product identifier, quantity and total cost where the total cost is the lowest of all products having the same vendor as the vendor of the products in the proposed order.

Least expensive in proposed order additional order calculator 234 in additional order calculator 230 performs the same calculations as least expensive additional order calculator 232, except the product selected is limited to those products in the proposed order stored in proposed order storage 212.

In one embodiment, least expensive in proposed order additional order calculator 234 is a part of the database that holds vendor thresholds and catalogs 210 as described above. Least expensive in proposed order additional order calculator 234 builds and makes a query to the database to select the product identifier, quantity and total cost where the total cost is the lowest of those products in the proposed order.

Scale proposed order additional order calculator 236 in additional order calculator 230 scales the proposed order in proposed order storage 212 to calculate a set of products that will produce the additional volume calculated by next threshold calculator 220 in approximately the same proportion as the proposed order stored in proposed order storage 212. Scale proposed order additional order calculator 236 scales the proposed order by identifying the product in the proposed order that has the lowest quantity, and for each product in the proposed order, dividing the number of units of that product by this lowest quantity identified to produce an additional quantity scale for each product in the proposed order. The additional quantity scale normalizes the quantities in the proposed order so that the product having the lowest quantity in the proposed order will normalize to an additional quantity scale value of '1'. For each product in the proposed order, the additional quantity scale for the product is multiplied by the weight of the product to produce a contribution of the product. The contribution of each product is the contribution to the volume of an order made by each additional unit quantity of the product. The additional volume identified by next threshold calculator 220 is divided by the sum of all the contributions to produce a multiplier. For each product in the proposed order, the additional quantity scale of the product is multiplied by the multiplier, and the result rounded up to the nearest whole number to produce the additional quantity of each product in the proposed order that will produce the desired additional volume. In one embodiment, some or all of scale proposed order additional order calculator 236 is a part of the database holding vendor thresholds and catalog 210 and the calculations described above are performed using one or more additional fields in the product table of the database.

As an example of scale proposed order additional order calculator, assume product A and B, having a volume contribution of 1 unit each. The proposed order is for 20 of product A and 50 of product B. The volume is calculated to be 70, and assume a next threshold of 105 units. The additional volume is calculated by next threshold calculator 220 is 35.

The lowest quantity identified is 20, and the additional quantity scale is 1 for product A, 5/2 for product B. The contribution is 1 for product A and 5/2 for product B. The multiplier is 35/(7/2) or 10. The additional quantity of product A identified by scale proposed order additional order calculator 236 is therefore 10, and product B is 25. These additional quantities are those that are in the same proportion as the proposed order in proposed order storage 212 which can be added to the proposed order to achieve the volume required for the next discount threshold.

In one embodiment, each additional order calculators 232, 234, 236 in additional order calculator 230 provide to administration 250 the product name, quantities, unit prices and extended prices (equal to the unit prices multiplied by the quantity) of each product or service identified as described above that is in the additional order. In one embodiment, each of the least expensive additional order calculator 232, least expensive in proposed order additional order calculator 234 and scale proposed order additional order calculator 236 has a separate quantity field in each product record in the product table of vendor thresholds and catalog 210. The quantities of each product corresponding to the additional orders calculated as described above are placed in these fields by the respective additional order calculators 232, 234, 236. Administration 250 can then retrieve the information regarding name, quantity, unit price and extended price from the database to display each of the additional orders as an optional order to be combined with the proposed order to achieve the next higher discount.

For each of the additional orders produced by additional order calculators 230, difference calculator 238 computes and provides to administration 250 the difference between the discounted price of the proposed order stored in proposed order storage 212 and the discounted price of a combined order containing the proposed order and each additional order. The discounted price is determined by computing the undiscounted price and subtracting the applicable discount. Difference calculator 238 computes the undiscounted price of the proposed order without the additional order and the undiscounted price of the proposed order combined with each additional order by multiplying the unit price of each product in such order by the quantity of that product.

Discount calculator 239 computes the discount by identifying the volume of each of the orders and identifying from vendor thresholds and catalog 210 the applicable discount for the proposed order and the proposed order with each of the additional orders. In one embodiment, the volume of the proposed order with any additional order is obtained from next threshold calculator 220 (because each of the additional orders has been defined to meet that threshold), and the volume of the proposed order is assumed to be one threshold below such volume. The applicable discount is supplied to difference calculator 238 which applies the discount to the proposed order and to the proposed order with each of the additional orders to provide a difference amount for each of the additional orders.

The proposed order and the additional orders along with the corresponding difference is received by administration 250 and supplied to the user via input/output 254. The user can indicate to administration 250 acceptance of any of the additional orders via input/output. If accepted, administration 250 adds the additional order accepted to the proposed order in proposed order storage 212 and the user can use administration 250 to select additional products or services to be added to the order, or to place the currently applicable proposed order. The user can direct administration 250 to place the order by transmitting it or printing it via input/output 254, or by storing an indication of the products ordered in vendor thresholds and catalog 210.

In one embodiment, information about prior orders may be used to calculate the discount. For example, the discount may be calculated based on the sum of the volume of the proposed order and the volume of all past orders placed during limited or unlimited period of time.

Prior order storage 214 holds information about past orders. This information may include a vendor identifier, the volume of the prior order, product, quantity, date, price and other information. In one embodiment, information about past orders is retrieved from the vendor corresponding to the vendor of the proposed order stored in proposed order storage 212. Prior to the calculations performed as described above, administration 250 obtains a communications identifier such as a modem telephone number or World Wide Web address corresponding to this vendor stored in vendor thresholds and catalog 210 and uses the communications identifier to retrieve via input/output 254 from a central database maintained by the vendor or a proxy of the vendor the volume of the prior orders that can be combined with the volume of the proposed order calculated above for the calculation of the next threshold and discount. Alternatively, the quantity of each product ordered may be retrieved so that these quantities may be added to the proposed order to calculate the volume, next threshold and discount in the same manner as is described above. Administration 250 uses a customer number and other information such as a password stored in vendor thresholds and catalog 210 to identify itself to the database. This allows order information from many of the apparati shown in FIG. 2, such as all the orders from a single customer, to be used to calculate the discount.

In one embodiment, all prior order information retrieved is used to calculate the next threshold and discount. In another embodiment, rules that describe which of the information retrieved may be combined with the proposed order are stored in vendor thresholds and catalog 210. These rules are used by one or both of next threshold calculator 220 and discount calculator 239 to combine prior order information stored in prior order information storage 214 with the proposed order stored in proposed order storage 212 to determine the applicable next threshold and discount. For example, the rules may state that only orders placed above a certain dollar amount and during a certain period of time may be combined with the proposed order stored in proposed order storage 212. A system date maintained by administration 250 may be communicated to next threshold calculator 220 and discount calculator 239 to determine any applicable period.

In still another embodiment, administration 250 maintains some or all of the volume and/or quantity and product information along with any dates in prior order storage 214 when each order is placed, and this information is used in place of, or in addition to, the information retrieved. Administration 250 may combine volume information collected via input/output 254 from other apparati similar to that shown in FIG. 2 if such combinations are allowed.

Figure 3:
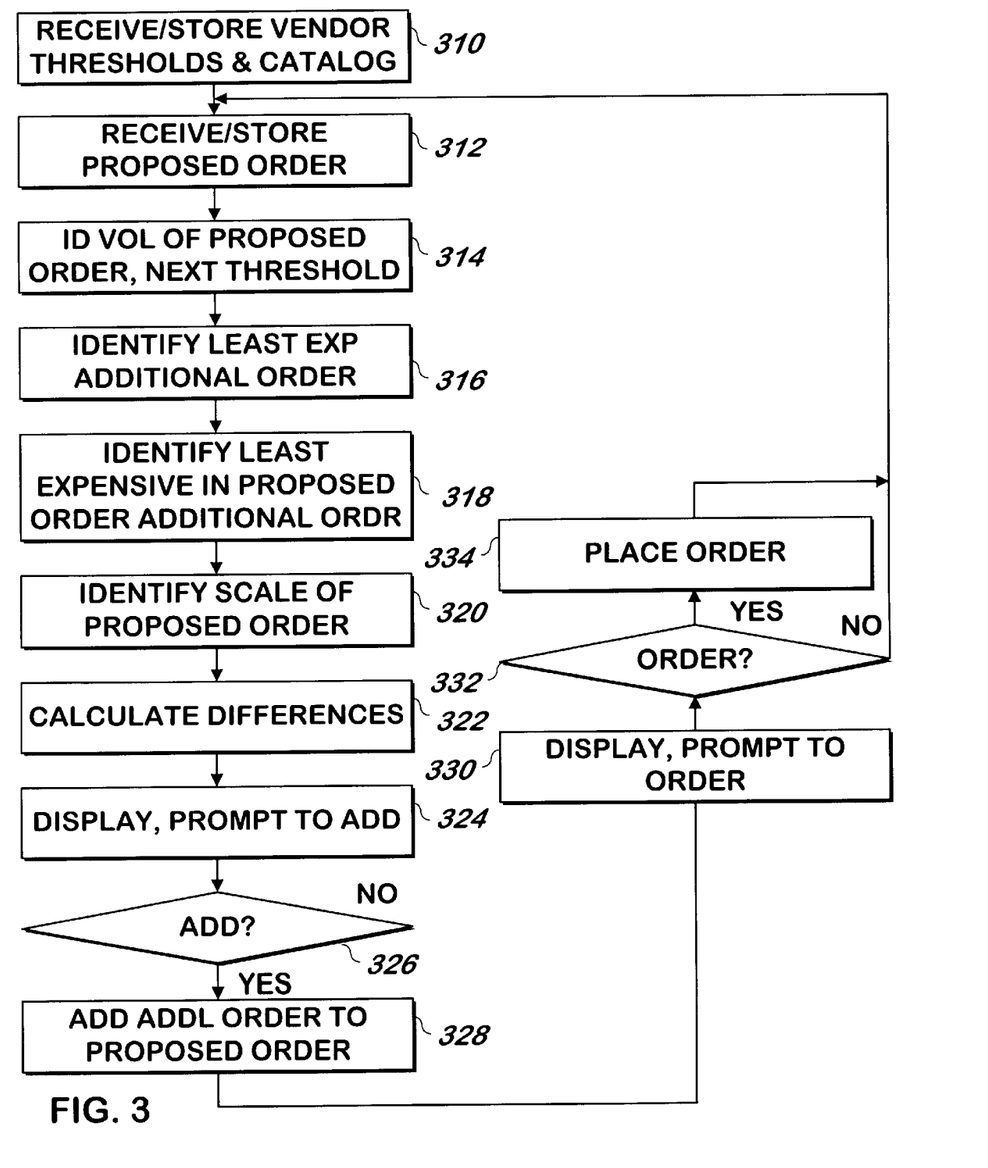
FIG. 3 is a flowchart illustrating a method of identifying orders for additional products to realize a higher discount than in a proposed order according to one embodiment of the present invention.

Referring now to FIG. 3, a method of identifying orders for additional products to realize a higher discount than in a proposed order according is shown according to one embodiment of the present invention. Vendor discount threshold and catalog information is received from one or more vendors and stored 310. In one embodiment, the vendor discount thresholds are stored in a discount table of a conventional database with each threshold containing a vendor name, a volume and a discount stored in each record of the discount table. Catalog information about the products available from each vendor are stored in a product table in a conventional database with the vendor name, product name, undiscounted price and weight stored in each record of the product table.

A proposed order is received from a user and stored 312. In one embodiment, the order is received from the user by listing all the vendors received in step 310, and allowing the user to select a vendor. Next the products available from the vendor selected are displayed and the user may select a quantity of each products to complete the proposed order.

The next threshold of the proposed order is calculated 314 by identifying the vendor, and calculating the volume, of the proposed order and identifying the record having the lowest volume in the discount table that exceeds the volume of the proposed order and matches the vendor of the proposed order. In one embodiment, the volume of the proposed order is calculated by summing the quantities of products in the proposed order. In another embodiment, the volume of the order is calculated by summing the multiplication product of the weight from the product table of each product in the proposed order by the quantity of products in the proposed order. In another embodiment, the volume of the proposed order is calculated by summing the multiplication products of the quantity of each product in the proposed order by the undiscounted price of that product found in the product table.

Potential additional orders are identified that, when added to the proposed order, will have a sufficient volume to cause the order to qualify for the next discount higher than the proposed order alone. In one embodiment, three potential additional orders are calculated and presented to the user.

The first additional order is identified 316 by selecting from the product table the least expensive product in the product table with a vendor field matching the vendor of the proposed order, and calculating the smallest quantity of such product that, when combined with the proposed order, produces a volume greater than or equal to the next threshold calculated in step 314. The second additional order is identified 318 by selecting from the proposed order the least expensive product in the proposed order, and calculating the smallest quantity of such product that, when combined with the proposed order, produces a volume greater than or equal to the next threshold calculated in step 314. The third additional order is identified 320 by calculating a scale of the proposed order as described above that, when combined with the proposed order, produces a volume greater than or equal to the next threshold calculated in step 314.

Although three different ways of identifying additional orders have been disclosed above, one, two, three or any other number of additional orders may be identified, as described above or in a different manner.

The difference between the discounted price of each of the proposed orders and the discounted price of the proposed order is calculated 322 to show the user how much more must be expended to receive the products identified in the additional order. These differences and any or all of the proposed or additional orders described above are displayed to the user, and the user is prompted 324 to select one of the additional orders to add to the proposed order, change the proposed order or make no change to the proposed order 326. If the user elects to add the additional order to the proposed order, the additional order is added 328 to the proposed order.

The user is prompted to place the proposed order, and if the user elects, the order is placed, but printing, recording or transmitting it. If the user does not wish to place the order, the method continues at step 312 to allow the user to modify the order or enter a new order.

As described above with reference to FIG. 2, in one embodiment, the volume of the proposed order and next threshold calculated in step 314 may include information about any prior orders placed within a limited or unlimited period of time. Information about prior orders may be maintained when the order is placed in step 334 or retrieved as described above as a part of step 314.

What is claimed is:

1. An apparatus for identifying at least one additional order having a first volume and comprising a description of a first set of at least one of a plurality of products, each product having a volume contribution and at least one quantity, the apparatus comprising:

at least one input for receiving:
  a proposed order having a second volume and comprising a description of at least one of a second set of at least one of the plurality of products; and
  a plurality of volume discount thresholds, each comprising a threshold volume;
at least one output for providing the additional order;
a next threshold calculator having a first input coupled to the at least one input to receive the proposed order and a second input coupled to the at least one input to receive the plurality of volume discount thresholds, the next threshold calculator for calculating the second volume responsive to the proposed order received at the next threshold calculator first input and for identifying and providing at an output an identifier of at least a portion of at least one of the volume discount thresholds having a threshold volume at least as high as the second volume; and
at least one additional order calculator having a set of at least one inputs coupled to the at least one input to receive at least a portion of the proposed order and to the next threshold calculator output to receive the at least one identifier of the threshold volume of the volume discount thresholds provided by the next threshold calculator output, each additional order calculator for identifying and providing at an output coupled to the apparatus output at least one quantity of the at least one of the products in the first set responsive to the products in the proposed order and to at least one of the threshold volumes received at the at least one additional order calculator input.

2. The apparatus of claim 1 wherein the at least one of the volume discount thresholds corresponding to the identifiers identified by the next threshold calculator comprises a volume discount threshold having a threshold volume nearer to the second volume than each of the threshold volumes of all volume discount thresholds having a threshold volume above the second volume.

3. The apparatus of claim 1 wherein:
each of the products in the proposed order has a price;
the set of at least one additional order calculator inputs is coupled to receive the price of the products in the proposed order;
at least one of the at least one additional order calculator comprises a least expensive in proposed order additional order calculator for identifying a first product having a price substantially lowest among the prices of the products in the proposed order; and
the first set of products in at least one of the at least one order having a quantity output by the least expensive in proposed order additional order calculator is the first product.

4. The apparatus of claim 1 additionally comprising:
a storage for storing information related to a third set of a plurality of products comprising the first set of products and a fourth set of at least one product, each of the products in the third set having a price; and
wherein:
the set of at least one order calculator inputs is coupled to receive the price of the products in the proposed order;
at least one of the at least one additional order calculator comprises a least expensive additional order calculator for identifying a quantity of a first product wherein the price of the first product multiplied by the quantity of the first product is substantially lowest among the prices multiplied by a quantity of the products in the third set, wherein the quantity of each of the products in the third set and first product is at least as high as the second volume divided by the volume contribution of said product; and
the first set of products in at least one of the at least one order having a quantity output by the least expensive additional order calculator is the first product.

5. The apparatus of claim 3 additionally comprising:
a storage for storing information related to a third set of a plurality of products comprising the first set of products and a fourth set of products, each of the products in the third set having a price stored in the storage;
the set of at least one order calculator inputs is coupled to receive the price of the products in the proposed order; and
wherein at least one of the at least one additional order calculator additionally comprises a least expensive additional order calculator for identifying a first product having a price substantially lowest among the prices of the products in the fourth set; and
the first set of products in at least one of the at least one order having a quantity output by the least expensive additional order calculator is the first product.

6. The apparatus of claim 3, wherein:
at least one of the additional order calculators comprises a scale proposed order calculator additional order calculator; and
the first set of products in at least one of the at least one order having a quantity output by the scale proposed order additional order calculator comprises the second set of products.

7. The apparatus of claim 5, wherein:
at least one of the additional order calculators comprises a scale proposed order additional order calculator; and the first set of products in at least one of the at least one order having a quantity output by the scale proposed order additional order calculator comprises the second set of products.

8. The apparatus of claim 1, wherein:

at least one of the additional order calculators comprises a scale proposed order additional order calculator; and the first set of products in at least one of the at least one order having a quantity output by the least expensive in scale proposed order additional order calculator comprises the second set of products.

9. The apparatus of claim 1 wherein the proposed order and each of the at least one additional orders has a price, each of the volume discount thresholds has a threshold discount, the apparatus additionally comprising a difference calculator having an input for receiving information related to the price of the proposed order, at least one of the additional orders and at least one threshold discount, the difference calculator for calculating and presenting at the at least one output at least one difference in price between the proposed order and at least one of the additional orders, said difference responsive to at least a plurality of threshold discounts related to the information received at the discount calculator input.

10. The apparatus of claim 9 additionally comprising a discount calculator having an input operatively coupled to receive information related to a threshold discount of a volume discount threshold having a threshold volume corresponding to the volume of the proposed order, and at least one additional threshold discount having a threshold volume corresponding to the volume of at least one of the additional orders, the discount calculator for identifying and providing to an output coupled to the discount calculator input a threshold discount corresponding to the volume discount threshold having a threshold volume corresponding to the proposed order and at least one of threshold discount corresponding to the volume discount threshold having a threshold volume corresponding to the additional orders.

11. The apparatus of claim 1 wherein the next threshold calculator calculates the second volume additionally responsive to prior order information received at a next threshold calculator third input.

12. The apparatus of claim 11 wherein at least one apparatus input is coupled to the next threshold calculator third input and the prior order information is received at the at least one apparatus input.

13. The apparatus of claim 11 additionally comprising a prior order storage having an output coupled to the next threshold calculator third input, the prior order storage for storing the prior storage information.

14. A method of identifying at least one additional order comprising information related to products, the method comprising:

receiving information related to a plurality of products;

receiving a plurality of sets of discount threshold information, each set comprising information related to at least one threshold volume and information related to at least one discount;

receiving a proposed order comprising at least one identifier of at least one product and having at least one volume;

identifying at least one of the volumes of the proposed order;

identifying at least one of the threshold volumes of at least one set of the discount threshold information received exceeding at least one of the volumes of the proposed order identified; and identifying at least one additional order, each of the additional orders having a volume at least as great as a difference between one of the threshold volumes identified and one of the volumes of the proposed order received.

15. The method of claim 14 wherein:

each of the product identifiers in the proposed order received has a weight;

the receiving information related to a plurality of products step comprises, for each of a plurality of products, receiving an identifier of the product and a price of the product; and the identifying at least one additional order step comprises:

identifying at least one of the product identifiers of the proposed order received wherein, for each product identifier identified, the price corresponding to said product identifier divided by the weight corresponding to said product identifier is not greater than substantially all of the prices received corresponding to other identifiers divided by the weights corresponding to the said other identifiers of the proposed order received; and calculating at least one lowest quantity of the at least one product identifiers identified wherein a sum of a multiplication product of the quantity of said product identifier and the weight of said product identifier is not less than the difference of the at least one threshold volume identified and the volume of the proposed order.

16. The method of claim 14 wherein:

each of the product identifiers received has a weight and a vendor;

the proposed order has a vendor;

the receiving information related to a plurality of products step comprises, for each of a plurality of products, receiving an identifier of the product and a price of the product; and the identifying at least one additional order step comprises:

identifying at least one of the product identifiers received having a vendor corresponding to the vendor of the proposed order wherein, for each product identifier identified, the price corresponding to said product identifier divided by the weight corresponding to said product identifier is not greater than substantially all of the prices received corresponding to other identifiers divided by the weights corresponding to said other product identifiers having the vendor of the proposed order received; and calculating at least one lowest quantity of the at least one product identifiers identified wherein a sum of a multiplication product of the quantity of said product identifier and the weight of said product identifier is not less than the difference of the at least one threshold volume identified and the volume of the proposed order.

17. The method of claim 14 wherein each of the product identifiers in the proposed order has a quantity, and the identifying the at least one additional order step comprises:

identifying a multiplier at least as great as a quotient having a numerator equal to the difference between the threshold volume identified and the volume of the proposed order received; and a denominator equal to the volume of the proposed order identified; and multiplying at least one of the quantities of the proposed order received by the multiplier identified.

18. The method of claim 15 wherein each of the product identifiers in the proposed order has a quantity, and the identifying the at least one additional order step additionally comprises:

identifying a multiplier at least as great as a quotient having a numerator equal to the difference between the threshold volume identified and the volume of the proposed order received; and a denominator equal to the volume of the proposed order identified; and multiplying at least one of the quantities of the proposed order received by the multiplier identified.

19. The method of claim 15 wherein:

each of the product identifiers received has a weight and a vendor;

the proposed order has a vendor; and the identifying at least one additional order step additionally comprises:

identifying at least one of the product identifiers received having a vendor corresponding to the vendor of the proposed order wherein, for each product identifier identified, the price corresponding to said product identifier divided by the weight corresponding to said product identifier is not greater than substantially all of the prices received corresponding to other product identifiers divided by the weights corresponding to said product identifiers having the vendor of the proposed order received; and calculating at least one lowest quantity of the at least one product identifiers identified wherein a sum of a multiplication product of the quantity of said product identifier and the weight of said product identifier is not less than the difference of the at least one threshold volume identified and the volume of the proposed order.

20. The method of claim 16 wherein each of the product identifiers in the proposed order has a quantity, and the identifying the at least one additional order step additionally comprises:

identifying a multiplier at least as great as a quotient having a numerator equal to the difference between the threshold volume identified and the volume of the proposed order received; and a denominator equal to the volume of the proposed order identified; and multiplying at least one of the quantities of the proposed order received by the multiplier identified.

21. The method of claim 18 wherein:

each of the product identifiers received has a weight and a vendor;

the proposed order has a vendor;

the identifying at least one additional order step additionally comprises:

identifying at least one of the product identifiers received having a vendor corresponding to the vendor of the proposed order wherein, for each product identifier identified, the price corresponding to said product identifier divided by the weight corresponding to said product identifier is not greater than substantially all of the prices received corresponding to other product identifiers divided by the weight of said other product identifier having the vendor of the proposed order received; and calculating at least one lowest quantity of the at least one product identifiers identified wherein a sum of a multiplication product of the quantity of said product identifier and the weight of said product identifier is not less than the difference of the at least one threshold volume identified and the volume of the proposed order.

22. The method of claim 14 comprising the additional steps of:

identifying a discounted price of the proposed order received;

identifying at least one discounted price of an order comprising the proposed order received and each of at least one of the additional orders identified;

subtracting the discounted price of the proposed order received from the discounted price of the order comprising the proposed order received and each of at least one of the additional orders identified to produce at least one result; and displaying the at least one result.

23. The method of claim 22 comprising the additional steps of:

prompting a user to select at least one additional order;

receiving a selection corresponding to at least one additional order; and building a new proposed order comprising the proposed order and the at least one additional order corresponding to the selection received.

24. The method of claim 23 comprising the additional step of placing an order corresponding to the new proposed order.

25. The method of claim 14 wherein the at least one threshold volumes identified exceed the sum of at least one of the volumes of the proposed order and a volume of at least one prior order.

26. The method of claim 25 comprising the additional step of receiving at least one indicator of the at least one prior order.

27. A computer program product comprising a computer useable medium having computer readable program code embodied therein for identifying at least one additional order comprising information related to products, the computer program product comprising:

computer readable program code devices configured to cause a computer to receive information related to a plurality of products;

computer readable program code devices configured to cause a computer to receive a plurality of sets of discount threshold information, each set comprising information related to at least one threshold volume and information related to at least one discount;

computer readable program code devices configured to cause a computer to receive a proposed order comprising at least one identifier of at least one product and having at least one volume;

computer readable program code devices configured to cause a computer to identify at least one of the volumes of the proposed order;

computer readable program code devices configured to cause a computer to identify at least one of the threshold volumes of at least one set of the discount threshold information received exceeding at least one of the volumes of the proposed order identified; and computer readable program code devices configured to cause a computer to identify at least one additional order, each of the additional orders having a volume at least as great as a difference between one of the threshold volumes identified and one of the volumes of the proposed order received.

28. The computer program product of claim 27 wherein:
each of the product identifiers in the proposed order received has a weight;
the computer readable program code devices configured to cause a computer to receive information related to a plurality of products comprise computer readable program code devices configured to cause a computer to, for each of a plurality of products, receive an identifier of the product and a price of the product; and
the computer readable program code devices configured to cause a computer to identify at least one additional order comprise computer readable program code devices configured to cause a computer to:
identify at least one of the product identifiers of the proposed order received wherein, for each product identifier identified, the price corresponding to said product identifier divided by the weight corresponding to said product identifier is not greater than substantially all of the prices received corresponding to other identifiers divided by the weights corresponding to the said other identifiers of the proposed order received; and
calculate at least one lowest quantity of the at least one product identifiers identified wherein a sum of a multiplication product of the quantity of said product identifier and the weight of said product identifier is not less than the difference of the at least one threshold volume identified and the volume of the proposed order.

29. The computer program product of claim 27 wherein:
each of the product identifiers received has a weight and a vendor;
the proposed order has a vendor;
the computer readable program code devices configured to cause a computer to receive information related to a plurality of products comprise computer readable program code devices configured to cause a computer to, for each of a plurality of products, receive an identifier of the product and a price of the product; and
the computer readable program code devices configured to cause a computer to identify at least one additional order step comprise computer readable program code devices configured to cause a computer to:
identify at least one of the product identifiers received having a vendor corresponding to the vendor of the proposed order wherein, for each product identifier identified, the price corresponding to said product identifier divided by the weight corresponding to said product identifier is not greater than substantially all of the prices received corresponding to other identifiers divided by the weights corresponding to said other product identifiers having the vendor of the proposed order received; and
calculate at least one lowest quantity of the at least one product identifiers identified wherein a sum of a multiplication product of the quantity of said product identifier and the weight of said product identifier is not less than the difference of the at least one threshold volume identified and the volume of the proposed order.

30. The computer program product of claim 27 wherein each of the product identifiers in the proposed order has a quantity, and the computer readable program code devices configured to cause a computer to identify the at least one additional order comprise:
computer readable program code devices configured to cause a computer to identify a multiplier at least as great as a quotient having a numerator equal to the difference between the threshold volume identified and the volume of the proposed order received; and a denominator equal to the volume of the proposed order identified; and
computer readable program code devices configured to cause a computer to multiply at least one of the quantities of the proposed order received by the multiplier identified.

31. The computer program product of claim 28 wherein each of the product identifiers in the proposed order has a quantity, and the computer readable program code devices configured to cause a computer to identify the at least one additional order step additionally comprise:
computer readable program code devices configured to cause a computer to identify a multiplier at least as great as a quotient having a numerator equal to the difference between the threshold volume identified and the volume of the proposed order received; and a denominator equal to the volume of the proposed order identified; and
computer readable program code devices configured to cause a computer to multiply at least one of the quantities of the proposed order received by the multiplier identified.

32. The computer program product of claim 28 wherein:
each of the product identifiers received has a weight and a vendor;
the proposed order has a vendor; and
the computer readable program code devices configured to cause a computer to identify at least one additional order step additionally comprise:
computer readable program code devices configured to cause a computer to identify at least one of the product identifiers received having a vendor corresponding to the vendor of the proposed order wherein, for each product identifier identified, the price corresponding to said product identifier divided by the weight corresponding to said product identifier is not greater than substantially all of the prices received corresponding to other product identifiers divided by the weights corresponding to said product identifiers having the vendor of the proposed order received; and
computer readable program code devices configured to cause a computer to calculate at least one lowest quantity of the at least one product identifiers identified wherein a sum of a multiplication product of the quantity of said product identifier and the weight of said product identifier is not less than the difference of the at least one threshold volume identified and the volume of the proposed order.

33. The computer program product of claim 29 wherein each of the product identifiers in the proposed order has a quantity, and the computer readable program code devices configured to cause a computer to identify the at least one additional order additionally comprise:
computer readable program code devices configured to cause a computer to identify a multiplier at least as great as a quotient having a numerator equal to the difference between the threshold volume identified and the volume of the proposed order received; and a denominator equal to the volume of the proposed order identified; and
computer readable program code devices configured to cause a computer to multiply at least one of the quantities of the proposed order received by the multiplier identified.

34. The computer program product of claim 31 wherein:

each of the product identifiers received has a weight and a vendor;

the proposed order has a vendor;

the computer readable program code devices configured to cause a computer to identify at least one additional order step additionally comprise:

computer readable program code devices configured to cause a computer to identify at least one of the product identifiers received having a vendor corresponding to the vendor of the proposed order wherein, for each product identifier identified, the price corresponding to said product identifier divided by the weight corresponding to said product identifier is not greater than substantially all of the prices received corresponding to other product identifiers divided by the weight of said other product identifier having the vendor of the proposed order received; and computer readable program code devices configured to cause a computer to calculate at least one lowest quantity of the at least one product identifiers identified wherein a sum of a multiplication product of the quantity of said product identifier and the weight of said product identifier is not less than the difference of the at least one threshold volume identified and the volume of the proposed order.

35. The computer program product of claim 27 additionally comprising:

computer readable program code devices configured to cause a computer to identify a discounted price of the proposed order received;

computer readable program code devices configured to cause a computer to identify at least one discounted price of an order comprising the proposed order received and each of at least one of the additional orders identified;

computer readable program code devices configured to cause a computer to subtract the discounted price of the proposed order received from the discounted price of the order comprising the proposed order received and each of at least one of the additional orders identified to produce at least one result; and computer readable program code devices configured to cause a computer to display the at least one result.

36. The computer program product of claim 35 additionally comprising:

computer readable program code devices configured to cause a computer to prompt a user to select at least one additional order;

computer readable program code devices configured to cause a computer to receive a selection corresponding to at least one additional order; and computer readable program code devices configured to cause a computer to build a new proposed order comprising the proposed order and the at least one additional order corresponding to the selection received.

37. The computer program product of claim 36 additionally comprising computer readable program code devices configured to cause a computer to place an order corresponding to the new proposed order.

38. The computer program product of claim 27 wherein the at least one threshold volumes identified exceed the sum of at least one of the volumes of the proposed order and a volume of at least one prior order.

39. The computer program product of claim 38 additionally comprising computer readable program code devices configured to cause a computer to receive at least one indicator of the at least one prior order.

* * * * *